United States Patent [19]

van den Wildenberg et al.

[11] Patent Number: 4,524,747
[45] Date of Patent: Jun. 25, 1985

[54] EVAPORATING-PRESSURE REGULATING DEVICE

[75] Inventors: Adrianus M. M. van den Wildenberg, Geldrop; Andreas L. M. T. Smeets, Eindhoven, both of Netherlands

[73] Assignee: Vialle B.V., Eindhoven, Netherlands

[21] Appl. No.: 577,112

[22] Filed: Feb. 6, 1984

[30] Foreign Application Priority Data

Feb. 4, 1984 [NL] Netherlands ............... 8300441

[51] Int. Cl.³ ..................................... F02M 31/00
[52] U.S. Cl. .................................. 123/557; 123/527
[58] Field of Search ............. 123/525, 527, 557; 48/189.2, 191, 180.1, 189.1

[56] References Cited

U.S. PATENT DOCUMENTS 2,315,881  4/1943  Thomas .................... 123/525
3,184,295  5/1965  Baverstozk ................ 123/557
4,216,751  8/1980  Davison .................... 123/557

FOREIGN PATENT DOCUMENTS 2613175  6/1977  Fed. Rep. of Germany ...... 123/557
3044744  3/1982  Fed. Rep. of Germany .
2428743  6/1978  France .
7900394  1/1979  Netherlands .

Primary Examiner—Ronald H. Lazarus
Attorney, Agent, or Firm—Buell, Ziesenheim, Beck & Alstadt

[57] ABSTRACT

An evaporating pressure regulating device is provided, more in particular for evaporating fuel of a combustion engine for both controlling the temperature and pressure of the fuel comprising an inlet conduit, a pressure reducing device and an outlet conduit. The outlet conduit comprises a heater/evaporator provided downstream of the reducing device, and the device further comprises a control member, a controllable injection member for liquid fuel provided downstream of the heater/evaporator and at least one temperature sensing device. The injection member is controlled by the control member. The temperature sensing device is setting the control member.

6 Claims, 1 Drawing Figure

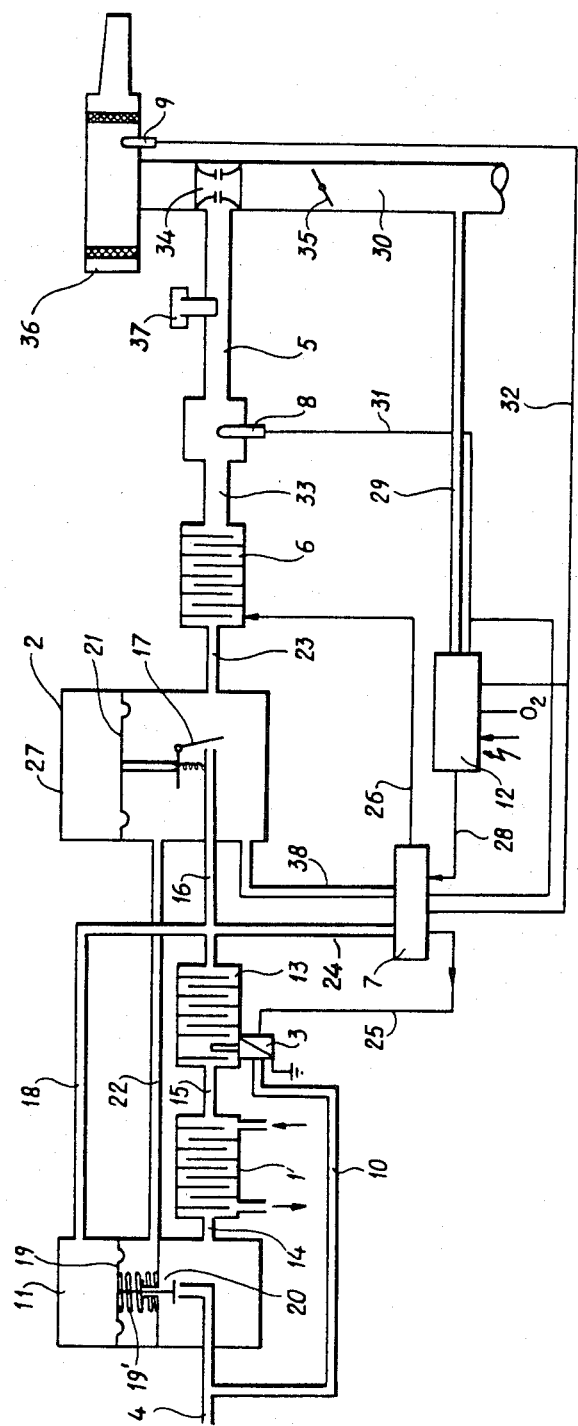

EVAPORATING-PRESSURE REGULATING DEVICE

The invention relates to an evaporating-pressure regulating device, more particular for fuel to be evaporated for a combustion engine, with an inlet conduit, a pressure reducing device and an outlet conduit, comprising a heater/evaporator provided downstream of the reducing device.

With such devices pressurized fuel for a combustion engine being stored in liquid state (for instance LPG), has to be converted into gas condition, before being suplied to the inlet conduit of said combustion engine. The evaporation of the liquefied gas requires a lot of heat.

The heat for evaporation can be delivered in several ways. It is possible to realise this electrically, the most important drawback being that the electric power has to be additionally generated. It is more usual to use the hot cooling medium or hot exhaust gases being available at combustion engines. To realise an optimum adjustment of the gas/air mixture, one aims at providing the gas with a predetermined temperature. Because the quantities of gas which have to be supplied to the inlet manifold do vary considerably and because it is difficult to store a quantity of gas with a predetermined temperature and predetermined pressure, the evaporator must be able to deliver both small and large quantities of gas having preferably a predetermined temperature immediately under rapid changing circumstances without too much flow resistance.

For this purpose in the prior art evaporators using cooling medium of the engine are known, wherein a thermostatic control member is provided in the cooling medium circuit to the evaporator. By this the temperature of the evaporator will on average remain constant, but the temperature of the gas leaving the evaporator will still vary considerably among others by the inertia of the cooling medium circuit, the delivered quantity of fuel and the inlet temperature thereof. Often there will be also some overcapacity, because such evaporators are used for combustion engines with widely varying power, by which the gas temperature will become higher than desired.

It is also desirable to adapt the gas temperature to the inlet temperature, because the mass ratio air/gas must be kept constant at varying inlet temperatures, at which however somewhat higher temperatures of the gas are preferred at very low air temperatures.

The invention aims to eliminate the above drawbacks and to meet the above requirements.

To this end an evaporator-pressure regulating device as described above comprises a control member, an adjustable injection member for liquid fuel provided downstream of the heater/evaporator and connected to the control member for being controlled thereby, and at least one temperature sensing device setting the control member.

By the adjustable injection member the liquid fuel is injected in the flow of fuel already evaporated in the heater/evaporator. Because evaporating of injected fuel takes a lot of energy and is nearly instantaneous, it is possible to provide very quickly a flow of gas with a predetermined temperature under widely varying circumstances as to the desired quantity.

Preferably in the outlet conduit also a heating member is provided, controllable by the control member. By this a further fine setting is possible at the through flow of large quantities of gas, while if this heating member is for instance heated by electricity or by exhaust gases, a heating of the gas at cold engine is provided because it takes some time for the cooling medium, providing the heater/evaporator with energy, is on temperature.

Preferably the control member of the evaporating/pressure regulating device can also be connected to a pressure sensing device being provided in the conduit downstream of the injection member. By this it can be prevented that, even if the temperature of the gas should be too high, the injection member further injects liquid fuel if the pressure in said conduit is too high.

A preferred embodiment of the invention will now be described with reference to the drawing, said drawing diagrammatically representing an evaporating-pressure regulating device cooperating with a combustion engine.

The evaporating-pressure regulating device comprises an inlet conduit 4 for liquid fuel, a first pressure reducing device 11, comprising a valve 20 controlled by the diaphragm 19 and the spring 19′, at which the pressure of the liquid is reduced and already a part of it is evaporated, and a heater/evaporator 1 being connected thereto by conduit 14, in which the liquid completely evaporates and the gas so formed is heated. In this example the heat required for heater/evaporator 1 is drawn from the cooling circuit of the combustion engine (of which only inlet 30 is shown), but for this purpose also the energy of exhaust gases of said engine or electric energy can be used. Thereupon the gas flows to the cooling member 13, through conduit 15 where the gas can be supplemented and cooled with the controllable injection of liquid gas through the injection member 3, being connected to conduit 4. The conduit leaving from the cooling member 13 has connections, at which a conduit 18 branches in a way known per se to the first reducing device to decrease the passage area of valve 20 at increasing pressure in the cooling member, and another conduit 24 branches to a control member 7 to be described and the last conduit 16 leads to a second reducing device 2. Said reducing device 2 can comprise any known suitable type of "second stage" evaporating-pressure regulating device. Here the diaphragm 21 is moved more or less downwardly, depending from the requirements of the combustion engine, which appear especially from the underpressure in conduit 23, by which the valve 17 more or less opens. So, a larger or smaller quantity of the gas being under constant pressure is admitted to the combustion engine. The pressure of the gas flowing from the second reducing device is conducted to the control member 7 through the conduit 38. To the outlet conduit 23 of the reducing device 2 an adjustable heating member 6 is connected. This heating member 6 can be heated electrically, but can also be provided with heat energy by cooling medium or exhaust gases. Between heater/evaporator 1 and the place of supply 34 of conduit 5 in the inlet manifold of the combustion engine, of said combustion engine only throttle valve 35 and air filter 36 are furthermore shown, a temperature sensing device 8 is provided, being placed in this example downstream of the controllable heating member 6. By means of the conduit 31 this device is connected to control member 7. Also a temperature sensing device 9 is provided in the inlet manifold 30 of the combustion engine upstream of point 34 at which the gas enters the inlet manifold, said device here being shown in the air filter 36. This temperature sensing device 9 is connected to control member 7 by conduit 32. The control member 7 is furthermore connected to a fuel control member 12, to which the temperature sensing devices are also connected.

The evaporating-pressure regulating device functions as follows in particular for controlling temperature of the gas: depending on the temperature of the suctioned air measured by the temperature sensing device 9 and on signals given by the fuel control device 12, an optimum temperature at the temperature sensing device 8 is determined and compared with the actual temperature there measured. Said optimum temperature can for instance be equal to the temperature of the temperature sensing device 9 to guarantee a constant mass flow ratio air/gas. At very low outdoor temperatures and cold engine very low gas temperatures are less desired because of the dew point of the fuel. For this reason the optimum temperature can for instance always be maintained 10° C. above the temperature measured by the temperature sensing device 9, or it can be maintained constant if the temperature measured there drops below a predetermined value. Also the optimum temperature can be made to depend on certain circumstances among others related to the load, the number of revolutions and the temperature of the engine. These data are processed by the fuel control member 12 and thereby a temperature correction is given to the control member 7.

The heater/evaporator 1 is sized so amply that if the heater/evaporator is on working temperature and the combustion engine does not deliver full power, the gas leaving it is always hotter than the optimum temperature described above which is determined by the control member 7. This temperature is observed by the temperature sensing device 8, whereupon the injection member 3 is opened by the control member 7. By the discharged liquid evaporating gas the temperature will drop very quickly and the pressure will increase in the cooling member 13 at constant mass flow in the outlet conduit, by which the opening area of the valve 28 of the first reducing device 11 is decreased because the pressure on the diaphragm 19 is increased through conduit 18. When the temperature has sufficiently dropped, the injection member 3 will be closed or opened to a lesser extent, by which more hot gas originating from the heater/evaporator vaporiser 1 can be admixed. If the mass flow of gas suddenly increases by increased load on the engine, more gas will flow through the first reducing device 11 and gas will be injected to a lesser extent by the injection member 3. By the combination of the first reducing stage 11, the heater/evaporator 1 with surplus capacity and the injection member 3, a system is provided being able to deliver gas with constant pressure and temperature, also at rapidly changing mass flow of gas. If the pressure in the cooling member 13 or in the outlet conduit of the second reducing device increases too much, the evaporating-pressure regulating device is protected against further pressure increase, because the control member 7 observes these pressures through conduit 24 and 38 respectively, and closes the injection member 3 if the pressure is too high, even if the temperature of the gas should be too high.

The adjustable heating member 6 provided after the second reducing device 2, functions to further heat the gas under certain circumstances. This can for instance happen at cold engine, at which if the heater/evaporator is provided with energy by cooling medium, it may take some time before the heater/evaporator is on temperature. By then heating the adjustable heating member 6 very quickly with exhaust gases or electrically way, the gas can nevertheless obtain a suitable temperature. If one or more temperature sensing devices 8 are provided, it is possible in cooperation with the control member 7, the injection member 3 and the heater/evaporator 1, to realise a very precise temperature control of the gas, which can be further refined by the controllable heating member.

We claim:

1. An evaporating pressure regulating device for liquefied gas to be evaporated into gas for an internal combustion engine comprising an inlet conduit receiving liquefied gas from a source of liquefied gas, a first pressure reducing means receiving liquefied gas from said inlet conduit, and metering the gas at a controlled rate to reduce the pressure thereof, a heater/evaporator receiving the gas from the first pressure reducing means for gasifying and heating the same, a second pressure reducing means receiving gas from the heater/evaporator, an adjustable injection means between the heater/evaporator and second pressure reducing means for injecting liquefied gas into the heated gas leaving the heater evaporator for controllably varying the temperature of the gas going to the second pressure reducing means, an outlet conduit from the second pressure reducing means leading to an intake manifold of an internal combustion engine, and control means connected to and receiving a gas pressure from each of a point between the injection means and second pressure reducing means and the outlet conduit, said control means acting on the injection means to vary the amount of liquefied gas in response to pressure signals from the gas pressure at its connections between the injection means and the second pressure reducing means and the outlet conduit.

2. An evaporating pressure regulating device as claimed in claim 1 having a temperature sensing means in said outlet conduit and connected to said control means sending a temperature signal to said control means acting in conjunction with the pressure signals to vary the injection of liquefied gas at the injection means.

3. An evaporating pressure regulating device as claimed in claim 2 having a second temperature sensing means in the intake manifold providing a temperature signal to the control means.

4. An evaporating pressure regulator as claimed in claim 1 having an adjustable heating means in the outlet conduit connected to and controlled by the control means to modify the temperature of the gaseous fuel in the outlet conduit.

5. An evaporating pressure regulator as claimed in claim 2 having an adjustable heating means in the outlet conduit between the second pressure reducing means and the temperature sensing means and connected to and controlled by the control means to modify the temperature of the gaseous fuel in the outlet conduit.

6. An evaporating pressure regulator as claimed in claims 1 or 2 or 3 or 4 or 5 wherein a fuel amount controller connected to the intake manifold and acted upon by the pressure therein is connected to the control means to supply a control signal thereto which acts on said control means along with the signals received by the control means to modify the injection means.

* * * * *